(12) United States Patent
Barnat et al.

(10) Patent No.: US 6,991,523 B2
(45) Date of Patent: Jan. 31, 2006

(54) COOLANT NOZZLE

(75) Inventors: Krzysztof Barnat, Berlin, CT (US);
Allan B. Packman, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 238 days.

(21) Appl. No.: 10/655,176

(22) Filed: Sep. 4, 2003

(65) Prior Publication Data

US 2005/0053433 A1 Mar. 10, 2005

(51) Int. Cl.
*B24B 1/00* (2006.01)
(52) U.S. Cl. .................. 451/53; 451/449; 451/450; 451/488
(58) Field of Classification Search ............... 451/449, 451/488, 7, 53, 450; 239/597, 599, 601, 239/589; 83/169, 171; 409/136, 61; 81/169, 81/171
See application file for complete search history.

(56) References Cited

U.S. PATENT DOCUMENTS

| | | | |
|---|---|---|---|
| 1,738,646 A * | 12/1929 | Graves ..................... 409/136 |
| 3,273,805 A * | 9/1966 | Hall ........................ 239/590.3 |
| 4,582,149 A * | 4/1986 | Slaughter, Jr. .............. 175/340 |
| 5,203,122 A * | 4/1993 | Campbell .................... 451/53 |
| 5,313,743 A | 5/1994 | Peschik |
| 5,430,936 A | 7/1995 | Yazdzik, Jr. et al. |
| 5,810,265 A * | 9/1998 | Cornelius et al. ........... 239/690 |
| 6,302,651 B1 | 10/2001 | Kildea et al. |
| 6,705,188 B2 * | 3/2004 | Gravely et al. ................ 83/22 |

OTHER PUBLICATIONS

S.L. Soo et al., Point Grinding of Nickel-Based Superalloys, Industrial Diamond Review, Feb. 2002, pp. 109-116.
Patent Abstracts of Japan, vol. 014, No. 323, Jul. 11, 1990 & JP 02 109654 A (Niigata ENG Co. Ltd.), Apr. 23, 1990.

* cited by examiner

*Primary Examiner*—George Nguyen
(74) *Attorney, Agent, or Firm*—Bachman & LaPointe, P.C.

(57) ABSTRACT

A coolant nozzle is used on a machine tool having a rotating bit of convoluted longitudinal profile for cutting a number of slots in a disk. The nozzle includes at least one coolant inlet and at least one coolant outlet. The coolant outlet has a convoluted section and is positioned to direct a coolant stream tangentially at the bit in a direction of rotation of the bit. Internal surface portions of the nozzle define one or more passageways between the inlet and the outlet(s).

20 Claims, 7 Drawing Sheets

US 6,991,523 B2

COOLANT NOZZLE

BACKGROUND OF THE INVENTION (1) Field of the Invention

The invention relates to machining. More particularly, the invention relates to the machining of blade attachment slots in turbomachine disks.

(2) Description of the Related Art

In turbomachines such as gas turbine engines, the blades of fan, compressor, and turbine sections may be secured to separate disks. One attachment means involves providing blade roots having a convoluted section complementary to a convoluted section of slots in the disk periphery. An exemplary configuration involving a convoluted profile that generally increases in transverse dimension from the slot base toward its opening is called a fir tree configuration. A number of methods have been used or proposed for forming the slots. Exemplary methods are discussed in S. L. Soo et al., "Point Grinding of Nickel-Base Superalloys", Industrial Diamond Review, February 2002, pages 109–116. In such a system, the introduction of coolant/lubricant is extremely important.

SUMMARY OF THE INVENTION

Accordingly, one aspect of the invention involves a coolant nozzle for use on a machine tool having a rotating bit of convoluted longitudinal profile for cutting a number of slots in a disk. The nozzle includes at least one coolant inlet and at least one coolant outlet. The coolant outlet has a convoluted section and is positioned to direct a coolant stream tangentially at the bit in a direction of rotation of the bit. Internal surface portions of the nozzle define one or more passageways between the inlet(s) and outlet(s).

In various implementations, the internal surface portions may be formed in a laser sintered ceramic body. The nozzle may have a guide surface positioned to direct the coolant stream toward the slots so that with the bit aside the slot between the disk and the outlet, the coolant stream passes laterally between the bit and the guide surface. There may be first and second outlets on first and second sides of a disk-receiving space. The nozzle may be shiftably mounted to permit the nozzle to be shifted between an operative condition wherein the nozzle blocks longitudinal extraction of the disk from the machine and a clear condition wherein the nozzle does not block such extraction.

Another aspect of the invention involves a coolant nozzle for use in a machine tool having a rotating bit for shaping a slot in a workpiece. The nozzle includes a gap for accommodating the workpiece in an operative position. The nozzle includes at least one coolant inlet. The nozzle includes first and second coolant outlets positioned to direct first and second coolant streams toward the workpiece from first and second sides of the workpiece. The nozzle includes first and second guide surfaces positioned to direct the first and second coolant streams toward the slot.

In various implementations, the guide surfaces may face in substantially opposite directions. The guide surfaces may have convoluted sections corresponding to convoluted sides portions of the slot as shaped by the bit. The outlets may have convoluted sections corresponding to the side portions of the slot. First and second guide surfaces and first and second outlets may be on respective first and second arms of a single sintered ceramic element.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
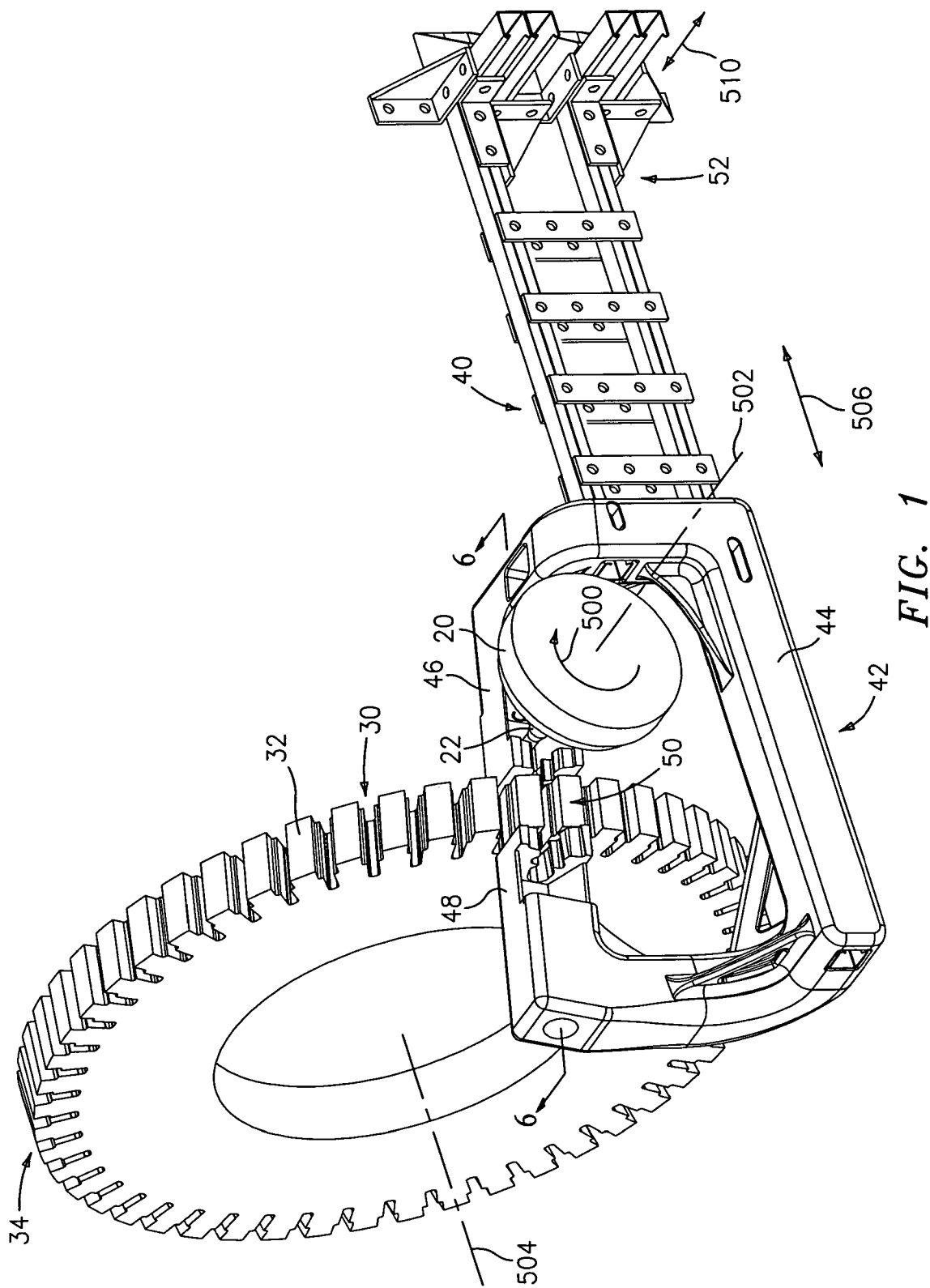
FIG. 1 is a view of a coolant nozzle in accordance with principles of the present invention in an operative position relative to a blade disk and a machine tool spindle.

FIG. 1 shows a machine tool spindle 20 carrying a bit 22 (e.g., an abrasive quill) for rotation in a direction 500 about a spindle axis 502. The tool is used to machine a series of blade retention slots from slot precursors 30 extending inward from the periphery 32 of a blade disk 34. The disk may be held in a fixture (not shown) for controlled rotation about its axis 504. The tool may reciprocally translate the spindle along an axis 506 transverse to the axis 502 to machine the slots. In an exemplary embodiment, the slots are ground from slot precursors having stepped sidewalls, although they may alternatively be ground directly from an uninterrupted periphery. The slot precursors (smaller clearance slots) may initially be ground by a stepped grinding wheel (not shown) and then enlarged/reconfigured by the bit 22. FIG. 1 further shows a coolant delivery system 40 having a nozzle 42. The nozzle 42 comprises a selective laser sintered (SLS) nozzle body 44 having first and second outlet arms 46 and 48. A gap or space 50 between the distal ends of the arms receives the disk when the disk and nozzle are in their operative positions. The nozzle may be mounted for movement transverse to the disk such as along a direction 510 by a sliding gantry mechanism 52 supporting the nozzle relative to the tool.

Figure 2:
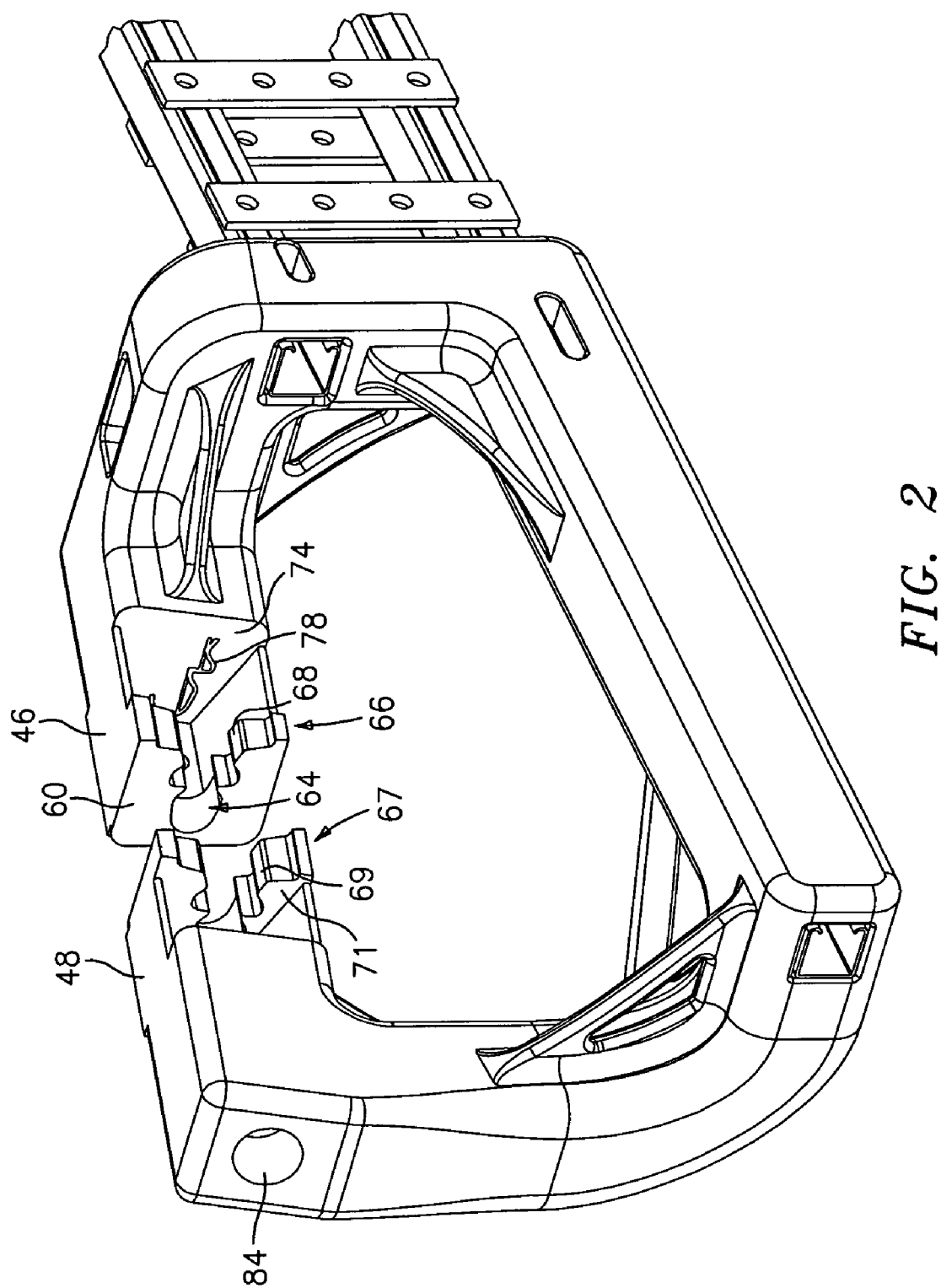
FIG. 2 is a first view of the nozzle of FIG. 1.
Figure 3:
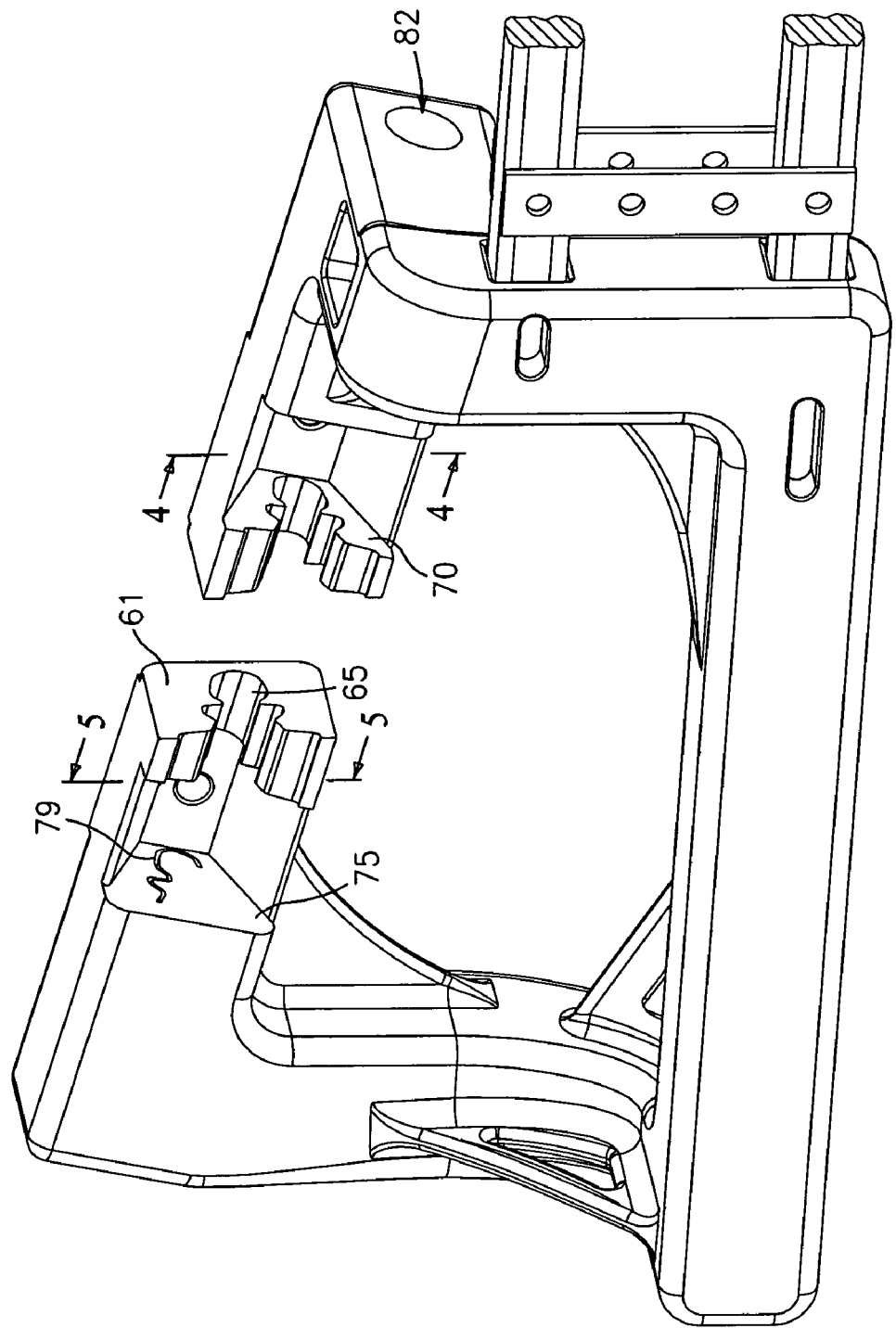
FIG. 3 is a second view of the nozzle of FIG. 1.
Figure 4:
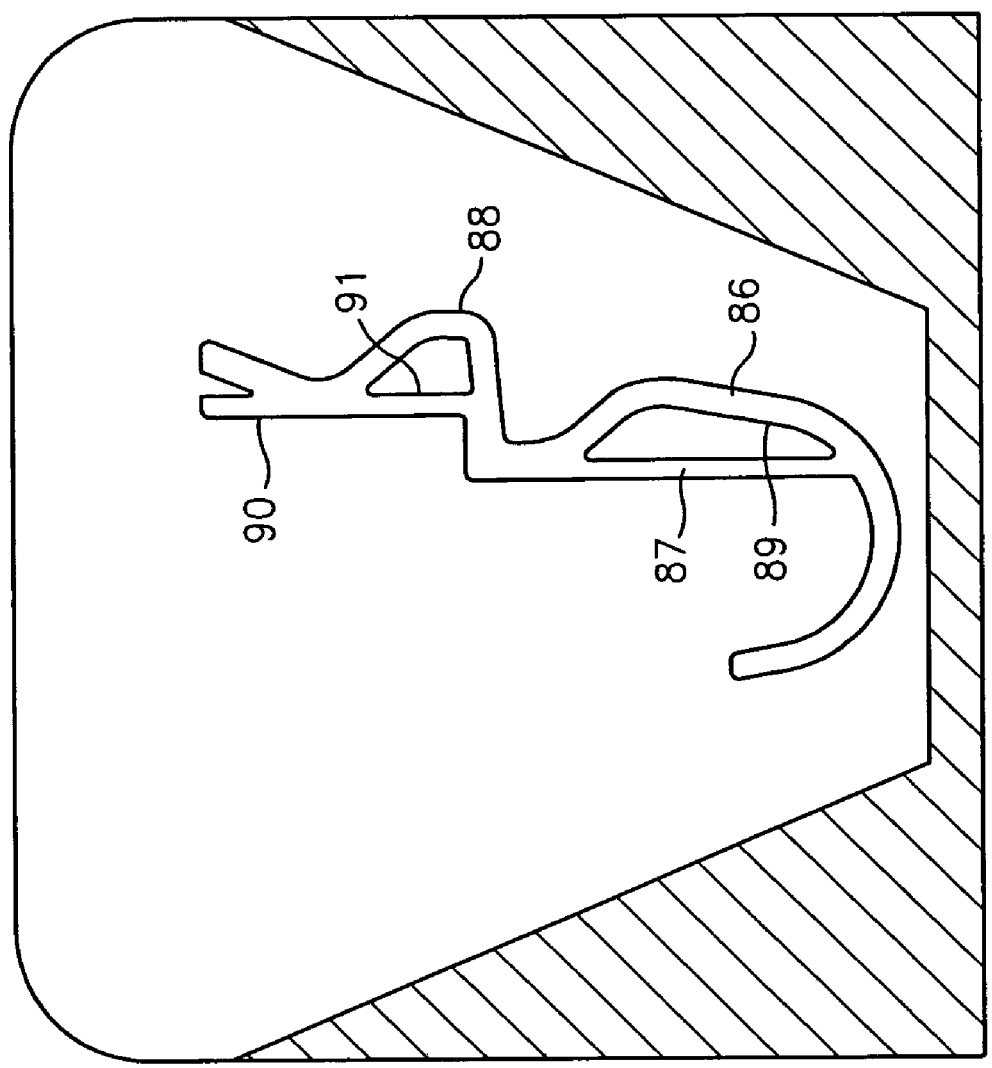
FIG. 4 is an end-view of a first outlet end surface of the nozzle of FIG. 1.
Figure 5:
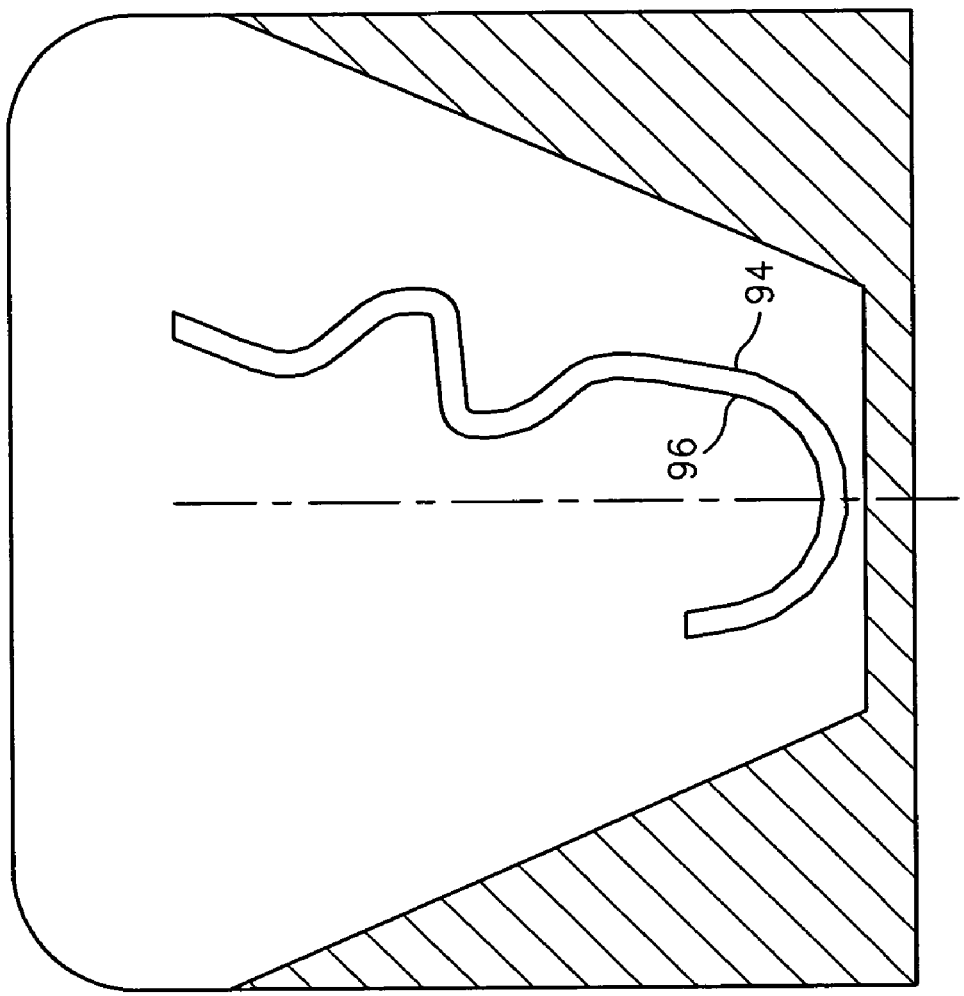
FIG. 5 is an end-view of a second outlet end surface of the nozzle of FIG. 1.

FIGS. 2 and 3 show further details of the nozzle 42. Each of the arms 46 and 48 has a distal end surface 60, 61. Each of these surfaces has an opening 64, 65 at least partially corresponding to a profile of the slots 30. Extending inboard from the opening 64, 65 along an end portion 66, 67 of the associated arm are surfaces 68, 69 which extend to associated inboard surfaces 70, 71 of the end portions. Spaced inboard of the end portions are respective outlet end surfaces 74, 75 having outlet apertures 78, 79. One or more passageways connect the outlet apertures to one or more coolant inlets. In the exemplary embodiment, the nozzle includes respective first and second coolant inlets 82 and 84 to which are connected appropriate fittings and coolant conduits (not shown). The first outlet aperture 78 has conjoined first and second portions 86 and 87. The first portion 86 (FIG. 4) has a perimeter with an outboard portion 88 and a segmented inboard portion 89 generally parallel to and slightly spaced apart from each other. The first portion 86 is formed in a convoluted profile corresponding at least partially to a profile of the bit and thus of the slot once machined. The second portion 87 has a perimeter with an inboard portion 90 and a segmented outboard portion 91. Segments of the outboard portion 91 face and at their ends join segments of the inboard portion 89 where the two outlet portions join. The second portion 87 is formed with a stepped convoluted profile corresponding at least partially to the profile of the slot precursor. The second outlet aperture 79 (FIG. 5) has a perimeter with outboard and inboard portions 94 and 96 also generally parallel to and slightly spaced apart from each other. In the exemplary embodiment, the outlet aperture 79 and the first portion 86 of the outlet aperture 78 extend along both sides of the bit profile near what would be the tip of the bit and then along only one side along substantially an entire grinding length of the bit. This particular side is chosen so that respective second and first coolant jets 102 and 100 (FIG. 6) expelled from the first outlet aperture impact tangentially with the rotation of the bit (rather than against such rotation) along this side.

Figure 6:
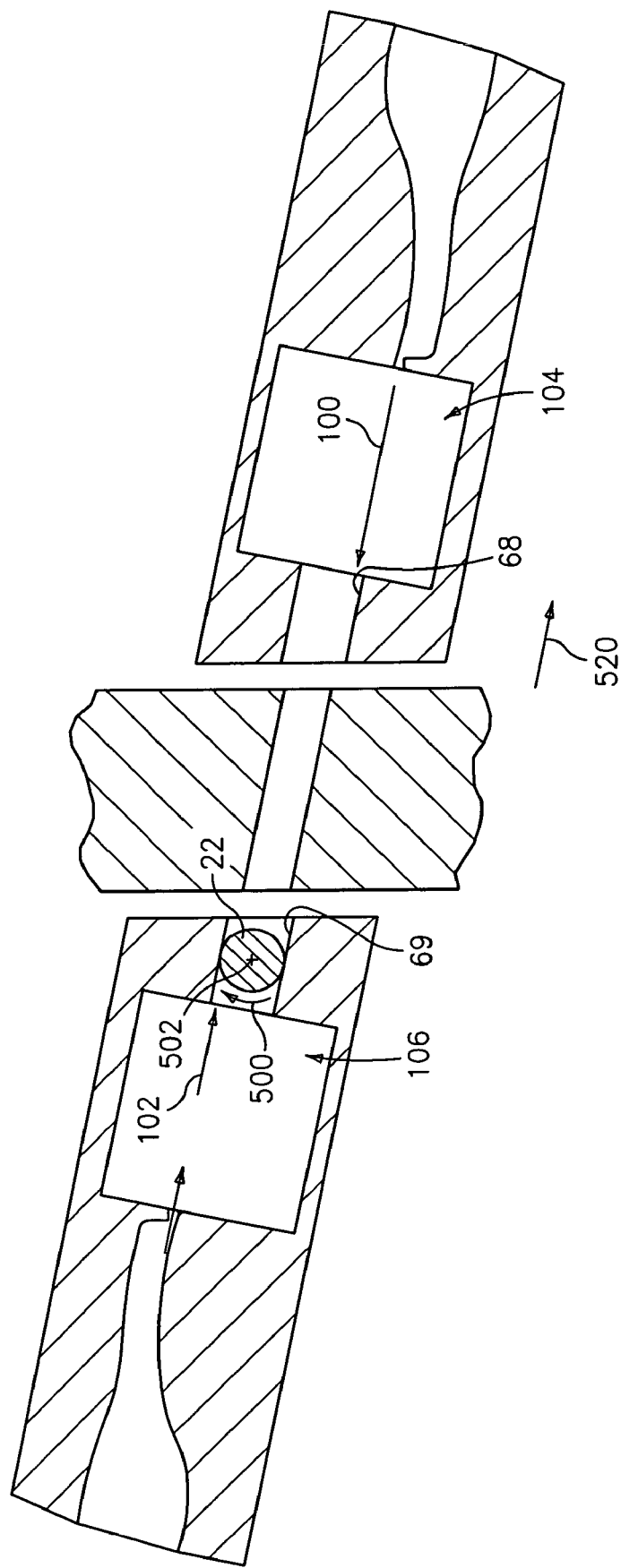
FIG. 6 is a sectional view of the nozzle of FIG. 1 taken along line 6—6 of FIG. 1 showing a machine tool bit in a first subsequent stage.
Figure 7:
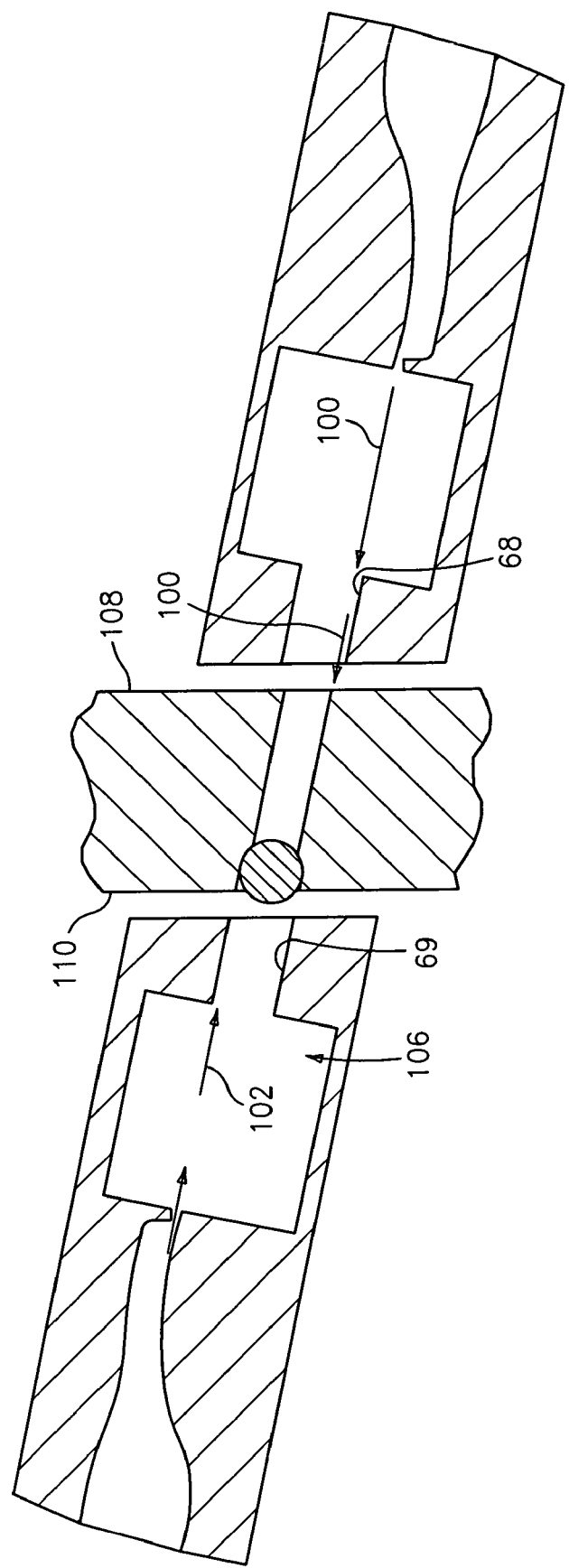
FIG. 7 is a sectional view of the nozzle and bit of FIG. 6 in a second subsequent stage.

FIG. 6 specifically shows the bit in an intermediate stage of its traversal along a direction 520. The bit has passed from a second receiving bay 106 into a channel defined by the surface 69. In this stage, coolant from the second nozzle aperture 79 impacts the bit as described above, guided by the surface 69 on the first side, however, due to the presence of uncut slot precursor, coolant from the first nozzle aperture 78 first portion 86 (a portion of a jet 100) does not effectively enter the slot precursor and is deflected by the disk first side 108. Coolant from the second portion 87 (the second portion of that jet 100) can substantially enter the slot precursor and cool the approaching bit, although impacting slightly less tangentially. In FIG. 7, the bit has passed out of the channel and spanned the gap between the nozzle and the disk and penetrated the second side 110 of the disk to begin to cut the slot from the precursor. As the bit passes further down the channel toward the disk, the surfaces 69 (in particular, that portion on the side aligned with the outlet) tends to further guide the jet 102 to the bit. Eventually, the bit will come out the first side 108 of the disk and enter the channel defined by the guide surfaces 68 and reach the first receiving bay 104. Once the bit passes all the way through the first side 108, the portion of the jet 100 from the first outlet aperture first portion 86 can tangentially impact the bit as described above. Thereupon, the bit/spindle may be retracted and traversed in opposite the direction 520 and reinserted into the second bay. Alternatively it may retraversed back through the machined slot. The disk may then be incrementally rotated to bring the next slot precursor into an operative position, whereupon the procedure is repeated.

One or more embodiments of the present invention have been described. Nevertheless, it will be understood that various modifications may be made without departing from the spirit and scope of the invention. For example, details of the slot to be ground and of the machine with which the nozzle is used may influence details of any implementation. Accordingly, other embodiments are within the scope of the following claims.

What is claimed is:

1. A coolant nozzle for use on a machine tool having a rotating bit of convoluted longitudinal profile for cutting a plurality of slots in a disk, the nozzle comprising:
    at least one coolant inlet;
    at least one coolant outlet having a convoluted section and positioned to direct a coolant stream tangentially at the bit in a direction of rotation of the bit; and
    internal surface portions defining one or more passageways between the at least one coolant inlet and the at least one coolant outlet.

2. The nozzle of claim 1 wherein the internal surface portions are formed in a laser sintered ceramic body.

3. The nozzle of claim 1 wherein;
    the at least one coolant outlet includes a first outlet and the nozzle further comprises a first guide surface positioned to direct the coolant stream of the first outlet toward the slot so that:
        with the bit aside the slot between the disk and the first outlet, the coolant stream of the first outlet passes laterally between the bit and the first guide surface; and
    the at least one coolant outlet includes a second outlet and the nozzle further comprises a second guide surface positioned to direct the coolant stream of the second outlet toward the slot so that:
        with the bit aside the slot between the disk and the second outlet, the coolant stream of the second outlet passes laterally between the bit and the second guide surface.

4. The nozzle of claim 3 wherein the first and second outlets are respectively on first and second sides of a disk-receiving space.

5. The nozzle of claim 3 in combination with the machine tool and bit and wherein the nozzle is shiftably mounted to permit the nozzle to be shifted between an operative condition wherein the nozzle blocks longitudinal extinction of the disk from the machine and a cleared condition in which the nozzle does not block said extraction.

6. A coolant nozzle for use on a machine tool having a rotating bit for shaping a slot in a workpiece, the nozzle comprising:
    a gap for accommodating the workpiece in an operative position;
    at least one coolant inlet;
    a first coolant outlet positioned to direct a first coolant stream toward the workpiece from a first side of the workpiece;
    a second coolant outlet positioned to direct a second coolant stream toward the workpiece from a second side of the workpiece;
    a first guide surface positioned to direct the first coolant stream toward the slot; and
    a second guide surface positioned to direct the second coolant stream toward the slot.

7. The coolant nozzle of claim 6 wherein the first and second guide surfaces face in substantially opposite directions.

8. The coolant nozzle of claim 6 wherein the first and second guide surfaces have convoluted sections corresponding to convoluted first and second side portions of the slot as shaped by the bit.

9. The coolant nozzle of claim 8 wherein first and second coolant outlets have convoluted sections corresponding to said first and second side portions of the slot as shaped by the bit.

10. The coolant nozzle of claim 6 wherein the first and second guide surfaces and first and second outlets are on first and second arms of a single sintered ceramic element.

11. The nozzle of claim 1 in combination with said disk and wherein the at least one coolant outlet is positioned to direct said coolant stream at the bit as the bit cuts said slots in the disk.

12. The nozzle of claim 11 wherein the internal surface portions are formed in a laser sintered ceramic body.

13. A coolant nozzle for use on a machine tool having a rotating bit of convoluted longitudinal profile for cutting a plurality of slots in a disk, the nozzle comprising:
   at least one coolant inlet;
   at least one coolant outlet having a convoluted section corresponding to convoluted portions of the slots as shaped by the bit and positioned to direct a coolant stream tangentially at the bit in a direction of rotation of the bit; and
   internal surface portions defining one or more passageways between the at least one coolant inlet and the at least one coolant outlet.

14. The nozzle of claim 13 wherein the internal surface portions are formed in a laser sintered ceramic body.

15. A coolant nozzle for use on a machine tool having a rotating bit of convoluted longitudinal profile for cutting a plurality of slots in a disk, the nozzle comprising:
   at least one coolant inlet;
   at least one coolant outlet having a convoluted section and positioned to direct a coolant stream tangentially at the bit in a direction of rotation of the bit;
   a first guide surface positioned to direct the coolant stream toward the slot so that, with the bit aside the slot between the disk and the first outlet, the coolant stream of a first outlet of said at least one coolant outlet passes laterally between the bit and the first guide surface; and
   internal surface portions defining one or more passageways between the at least one coolant inlet and the at least one coolant outlet.

16. The nozzle of claim 15 wherein the internal surface portions are formed in a laser sintered ceramic body.

17. A coolant nozzle for use on a machine tool having a rotating bit of convoluted longitudinal profile for cutting a plurality of slots in a disk, the nozzle comprising:
   at least one coolant inlet;
   at least one coolant outlet having a convoluted section and positioned to direct a coolant stream tangentially at the bit in a direction of rotation of the bit, the at least one coolant outlet comprising first and second outlets on first and second sides of a disk-receiving space; and
   internal surface portions defining one or more passageways between the at least one coolant inlet and the at least one coolant outlet.

18. The nozzle of claim 17 wherein the internal surface portions are formed in a laser sintered ceramic body.

19. A combination of a coolant nozzle and a machine tool comprising:
   the machine tool having a rotating bit of convoluted longitudinal profile for cutting a plurality of slots in a disk; and
   the nozzle comprising:
      at least one coolant inlet;
      at least one coolant outlet having a convoluted section and positioned to direct a coolant steam tangentially at the bit in a direction of rotation of the bit; and
      internal surface portions defining one or more passageways between the at least one coolant inlet and the at least one coolant outlet, the nozzle being shiftably mounted to permit the nozzle to be shifted between an operative condition wherein the nozzle blocks longitudinal extraction of the disk from the machine and a cleared condition in which the nozzle does not block said extraction.

20. The nozzle of claim 19 wherein the internal surface portions are formed in a laser sintered ceramic body.

* * * * *

UNITED STATES PATENT AND TRADEMARK OFFICE
CERTIFICATE OF CORRECTION

PATENT NO. : 6,991,523 B2 Page 1 of 1
APPLICATION NO. : 10/655176
DATED : January 31, 2006
INVENTOR(S) : Krzysztof Bamat et al.

It is certified that error appears in the above-identified patent and that said Letters Patent is hereby corrected as shown below:

In column 4, claim 3, line 6, after "wherein" the ";" should read a --:--.

In column 4, claim 5, line 29, "extinction" should read --extraction--.

Signed and Sealed this

Nineteenth Day of December, 2006

JON W. DUDAS
*Director of the United States Patent and Trademark Office*